GEORGE W. LOCKWOOD.
Improvement in Combined Garden-Hoe and Rake.
No. 127,077.  Patented May 21, 1872.
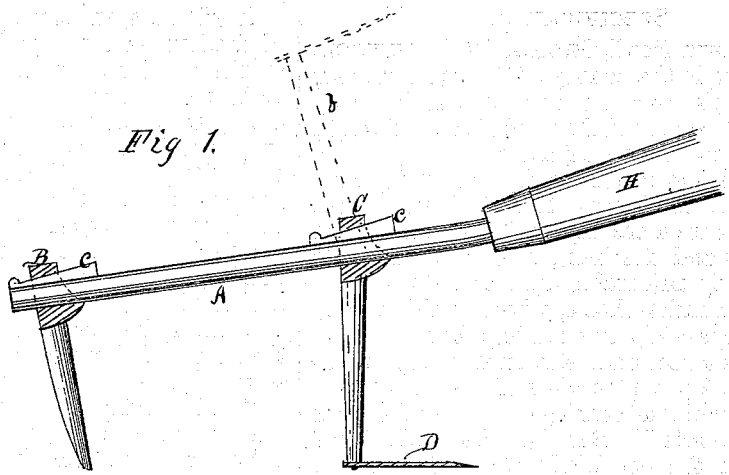
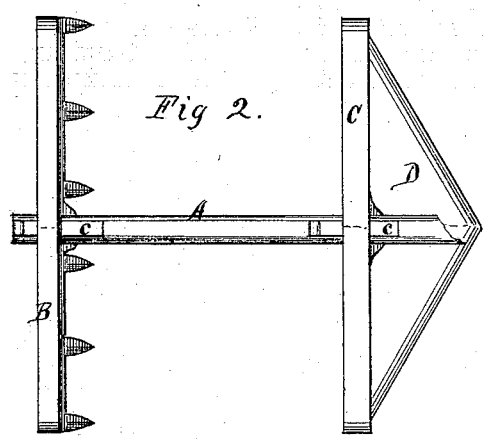

UNITED STATES PATENT OFFICE.

GEORGE W. LOCKWOOD, OF FAIRPORT, NEW YORK.

IMPROVEMENT IN COMBINED GARDEN HOES AND RAKES.

Specification forming part of Letters Patent No. 127,077, dated May 21, 1872.

SPECIFICATION.

Be it known that I, GEORGE W. LOCKWOOD, of Fairport, in the county of Monroe and State of New York, have invented certain Improvements in "Combined Hoe and Rake," of which the following is a specification:

My invention relates to that class of garden implements combining both hoe and rake; and it consists more especially in making the rake-head and the hanger for the hoe-blade conveniently adjustable upon and detachable from the handle-shank, whereby either may be used separately or both together.

Fig. 1 is a sectional elevation of my invention. Fig. 2 is a plan view of the same.

A represents the shank, connecting the parts with the handle H. B is the rake-head; C, the hanger for the hoe-blade D. The shank A may be flattened on the upper or lower side, or both, for the purpose of receiving the keys $c$, and a corresponding fullness formed in the eye of the rake-head B and the hanger C. By this means the rake and hoe are retained in the proper relative position to each other, and they are also firmly secured to the shank by the keys.

It will be seen that by loosening the key $c$ of the hanger C the position of the latter upon the shank may be changed longitudinally, as may be desired; or it may be swung up, as indicated by dotted lines $b$, Fig. 1, if the rake only is to be used; or it may be removed entirely by first removing the rake-head; or, (which may sometimes be desirable for certain kinds of weeding,) the implement may be converted into a "shuffle-hoe" and rake, by reversing the order of their arrangement upon the shank.

Ordinary set-screws may be substituted for the keys $c$ if desired; but the latter are considered quite as efficient, and less expensive.

What I claim as my invention is—

A combined garden hoe and rake having either or both adjustable upon the shank, reversible or detachable, for the purposes set forth.

GEO. W. LOCKWOOD.

Witnesses:
A. O. GANIARD,
H. B. HAMILTON.